United States Patent [19]

Daulton

[11] Patent Number: 4,596,334
[45] Date of Patent: Jun. 24, 1986

[54] LOCKING GUN RACK

[76] Inventor: Robert A. Daulton, Box 149 GRR2, Chino Valley, Ariz. 86323

[21] Appl. No.: 528,214

[22] Filed: Aug. 31, 1983

[51] Int. Cl.⁴ .............................................. A47F 7/00
[52] U.S. Cl. ......................................... 211/64; 211/4;
 211/8; 70/61; 224/913; 224/42.45 R; 248/553;
 403/388; 403/408.1; 411/119; 411/337
[58] Field of Search ..................... 211/4, 64, 8, 60 SK,
 211/60 T; 224/913, 42.45 R; 248/553; 70/61;
 403/388, 408, 104

[56]  References Cited
 U.S. PATENT DOCUMENTS

| 2,316,995 | 4/1943 | Smith | 211/64 X |
|---|---|---|---|
| 2,946,452 | 7/1960 | Caloiero et al. | 211/4 |
| 3,326,385 | 6/1967 | Pinkerton et al. | 211/4 |
| 3,419,843 | 12/1968 | Hays | 403/388 X |
| 3,618,785 | 11/1971 | Newman | 211/4 |
| 3,643,811 | 2/1972 | Howerton | 211/64 |
| 3,767,093 | 10/1973 | Pinkerton et al. | 224/1 R |
| 3,857,491 | 12/1974 | Townsend et al. | 211/8 |
| 4,139,100 | 2/1979 | Reed | 211/64 X |

Primary Examiner—Robert W. Gibson, Jr.
Assistant Examiner—Blair M. Johnson
Attorney, Agent, or Firm—Joseph H. Roediger

[57] ABSTRACT

A locking gun rack for vehicle mounting includes a slidable member for holding a latch member in locking position and a bolt lock for holding the slidable member in locked position and also includes slots for receiving the square shank of a carriage bolt which is threaded into a stationary member. The slot prevents rotation of the carriage bolt in the rack locked position and permits rotation of the carriage bolt in the rack unlocked condition. The latch member has a tongue extending through a slot in the slidable member and a lug engageable behind the slot in the locked condition.

6 Claims, 9 Drawing Figures

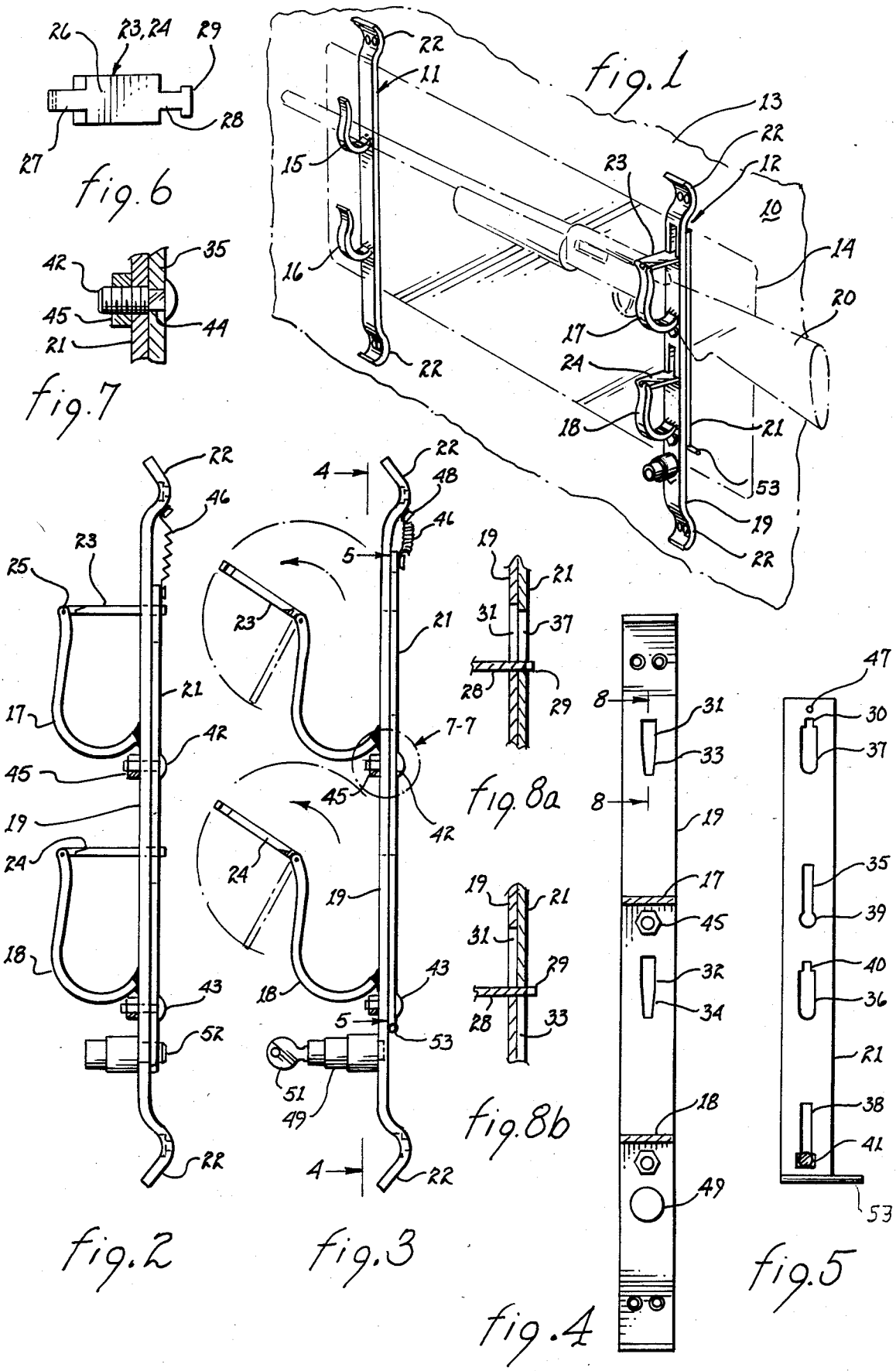

LOCKING GUN RACK

BACKGROUND OF THE INVENTION

This application relates to locking gun racks, more particularly to gun racks intended for use with rifles and/or shotguns to be mounted in mobile vehicles and it is an object of the invention to provide an improved locking gun rack of this nature.

Gun racks of the character indicated usually comprise a pair of vertical frames which may be attached to the rear wall of a truck or recreation vehicle cab. One of the frame members provides hooks for receiving the barrel of a gun and the other frame member provides hooks for receiving the stock of the same piece. The frame member used with the stock end of the gun is provided with some means for locking the guns in place.

For prior devices of this nature, reference may be made to U.S. Pat. Nos. 3,326,385 Pinkerton et al, 3,643,811 Howerton, 3,767,093 Pinkerton et al, 3,857,491 Townsend et al, and 4,139,100 Reed.

SUMMARY OF THE INVENTION

Prior devices have not had adequate means for preventing disassembling of the locking gun rack after installation and it is an object of the invention to provide such structure.

In carrying out the invention in one form there is provided a locking gun rack having a barrel supporting frame member and a stock supporting frame member, one of the frame members including a locking mechanism comprising, a first vertical member for attachment to a supporting surface, at least one gun yoke attached at one end to the first vertical member, the gun yoke having another end, a latch member having one end pivotally attached to the other end, a first slot in the first vertical member, the latch member having a second end of reduced cross-section for reception in the first slot, a second vertical member attached to the first vertical member and slidable between two positions with respect thereto, a second slot in the second vertical member and mating with respect to the first slot, an enlarged head portion at the end of the second end and capable of passing through the mating slots in one position thereof, the second slot having a reduced section at one end thereof for engagement behind the enlarged head portion in a second position of the mating slots, and locking mechanism for preventing movement of the second vertical member relative to the first vertical member wherein the slots are in the second position of the mating slots.

Further, the first and second vertical members are bolted together and the bolts are prevented from being removable in the locked condition of the rack.

It is a further object of the invention to provide an improved gun rack of the character described that is simple to make, easy to use, and efficient in operation.

BRIEF DESCRIPTION OF THE DRAWINGS

For a better understanding of the invention, reference should be had to the accompanied drawing in which:

FIG. 1 is a diagrammatic view of the inventive apparatus shown attached to the rear wall of the cab of a recreational vehicle;

FIG. 2 is a side view on an enlarged scale of one component of the invention;

FIG. 3 is a side view similar to FIG. 2 with certain operating components shown in a different position;

FIG. 4 is a sectional view taken substantially in the direction of arrows 4—4 of FIG. 3;

FIG. 5 is a sectional view taken substantially in the direction of arrows 5—5 of FIG. 3;

FIG. 6 is a plan view of one of the operating parts of the inventive structure;

FIG. 7 is a sectional view on an enlarged scale of one of the locking features of the inventive structure; and FIGS. 8A and 8B are sectional view taken, in effect, along the lines 8—8 of FIG. 4 and showing two operating positions of the moving parts.

DESCRIPTION OF THE PREFERRED EMBODIMENT

Referring to the drawings the invention is shown in a gun rack system 10 comprising a pair of vertically disposed frame members 11 and 12 to be attached to the rear wall 13 of the cab of a truck, for example, the rear view window being shown diagrammatically by the dotdash line 14. It will be obvious that the frame members 11 and 12 may, of course, be attached to any suitable supporting surface.

The frame member 11 has two hooks or yokes 15 and 16 for receiving gun barrels and the frame member 12 has two yokes 17 and 18 for supporting the stock ends of the same gun. More or less yolks may be provided. The yokes 15 and 16 may be of any suitable shape as shown and are welded to the upright frame member 11. Similarly, the yoke members 17 and 18 are of the appropriate shape as shown and have one end welded, for example, to the upright member, or frame 12. The frame member 12 has a stationary part 19 and a movable part 21 to achieve the locking function as will be described. Each of the frame members 11 and the stationary part 19 of frame 12 include inwardly directed or offset portions 22 through which appropriately attaching bolts may be provided through suitable holes for holding the frame members to the cab part 13 as will be understood. The offset portions 22 space the main frame members away from the wall of the cab part 13 so that the user can appropriately use his hands for putting the gun into the rack or removing it therefrom and also to provide space for the movable part 21 to operate in. For convenience the gun shown in phantom lines may be referred to by the reference character 20.

As may be seen in FIG. 1 the yokes 15 and 16 are open at the top so that the barrel of gun may be easily disposed therein whereas the yokes 17 and 18 are closed, respectively, by latch plates 23 and 24 so that when the locking mechanism is effective the gun may not be removed from the yokes.

In FIG. 1 the latch plates 23 and 24 are shown in a substantially horizontal position which is to say that the movable member 21, while shown in the upward position, can be moved downwardly to effect locking as will become clear.

Referring more particularly to FIGS. 2 and 3 it will be seen that the latch plates 23 and 24 are pivoted at their left ends by pins 25 to the upper ends of the yokes 17 and 18, respectively. In FIG. 2 the latch plates 23 and 24 are shown down which would be the closed position in which locking has taken place, the movable member 21 being in the downward position. In FIG. 3 the latch plates 23 and 24 are shown partially open (solid lines) and fully open (dotted lines). And in the latter position any gun held within the yokes 17 and 18 may, of course, be removed. Also in this figure the movable member 21 is shown in its upward or open position.

The latch plates 23 and 24 as may be seen best in FIG. 6 include a generally rectangular body portion 26, a narrow extension 27 which is received between the bifurcated ends of the yokes 17 and 18 and pivotally held thereto by the pins 25. The adjacent end of the body 26 may be undercut as shown so that the latch plates 23 and 24 may pivot completely around as shown in FIG. 3. The opposite end of the body 26 includes an extension or locking tongue 28 which terminates in a lateral enlargement or lug 29, the tongue 28 and the lug 29 forming the locking engagement structure as will be described.

Referring to FIG. 4 it will be seen that the stationary frame member 19 includes a pair of slots 31 and 32. The upper parts of the slots 31 and 32 are generally rectangular and of a suitable width to receive the lug 29 and the lower portions of slots 33 and 34 are tapered and are narrower so that the bottom thereof is of a dimension to just easily receive the locking tongue or extension 28. Referring to FIGS. 3 and 8A, it will be observed that when the latch plate 23 pivots clockwise, the lug 29 and the tongue 28 have to move through the slot 31 and the tongue 28 is received in the lower or tapered portion of the slot namely 33.

Referring to FIG. 5 it will be seen that the movable member 21 includes slots 35 and 38 and also slots 37 and 38. Slots 37 and 36 mate with the slots 31 and 32 respectively and are of the same width. The width of the slots 37 and 36 is such as to accommodate the extent of the lug 29. The upper portion of the slots 37 and 36 include rectangular portions 30 and 40 respectively which are narrower than the main portion of the slots 37 and 36, and are of a dimension to accommodate the locking tongues 28 of the latching plates 23 and 24. The slots 35 and 38 of sliding member 21 are generally rectangular in shape but at their lower ends include an enlarged circular part 39 and 41 respectively. The main rectangular bodies 35 and 38 of these slots are to accommodate the square shanks of carriage bolts as will be described and the enlarged circular portions 39 and 41 are provided so that in the assembling position of the slide member 21, the carriage bolt may be screwed into the receiving hole in stationary member 19 as will be described.

For assembly purposes the slidable member 21 is disposed against the stationary member 19 as may be visualized in FIGS. 3, 8A and 8B. In FIGS. 3 and 8A the members 19 and 21 are disposed with respect to each other in the open position and in this position the lug 29 as part of the latch plates 23, 24 may be pivoted clockwise so that the lug moves through the mating slot 31 and 37. In this position the lug 29 will be disposed behind the movable part 21. When it is intended to lock the apparatus the slidable member 21 is moved downwardly into the position shown in FIG. 8B. In this position the slot 37, for example, has moved downwardly until the rectangular part 30 has engaged the tongue 28 and is in front of the lug 29. Hence, the latch plate 23 cannot be pivoted upwardly because it is held down by engagement with the rectangular slot 30. Similarly, of course, for the latch plate 24 and the slots 32, 36 and 40.

For assemblying after the movable member 21 and the stationary member 19 are placed adjacent to each other as may be visualized in FIG. 3, a pair of carriage bolts 42 and 43 are disposed through the slots 35 and 38 and particularly the enlarged portions 39 and 41 thereof. The receiving holes in the stationary member 19 are threaded as may be seen in FIG. 7 and the carriage bolts 42 and 43 are screwed thereinto and to make certain that this can take place the square shank 44 of the carriage bolt is rotatable in the enlarged parts 39 and 41. When the carriage bolt has been screwed into the proper distance nuts 45 are screwed over the ends of the bolt 42 and clamped down tightly so that the bolt cannot easily rotate. In this position the square shank of the carriage bolt is disposed so that it easily will slide in the rectangular portions 35 and 38 of the slots of these same reference characters. Thus in the locked position of the movable frame 21, that is to say when it is down as in FIGS. 2 and 8B the square shank 44 of the carriage bolts 42 and 43 are received in the rectangular portions 35 and 38 of the slots and the carriage bolts therefore cannot be rotated out. Thus there is greater security because even though the mechanism is locked and a person removes the nuts 45 he cannot retract or turn out the carriage bolts 42 and 43.

When the movable frame member 21 is disposed against the stationary frame member 19 and assembled thereto a spring 46 is attached to the upper end of each of these members. The end of the spring is disposed through a hole 47 in the upper end of frame member 21 and is attached to a welded nib 48 at the upper end of frame member 12. The spring is in the relaxed condition as shown in FIG. 3 when the slidable member 21 is in the upper or unlocked position. When the slidable member 21 is moved downwardly to the locked position the spring 46 is stretched as shown in FIG. 2.

Attached as shown to the stationary frame member 19 there is a bolt-type lock 49, a key 51 being provided for locking and unlocking purposes. The lock 49 may be of any well-known type such, for example, as those used on automobile doors. A bolt 52 is part of the lock and may be pushed inwardly through an appropriate hole in the stationary member 19 and through the hole 41 or enlarged part of slot 38. When the bolt 52 is received through the hole in stationary member 19 and the enlarged part 41 the member 21 cannot move relative to the member 19 and the two parts are locked together. This is done when, for example, a gun or guns are in the rack and the latch plates 23 and 24 have been moved to the horizontal position. In this position the slide member 21 is moved downwardly and the locking functions as described take place.

An extending finger 53 may be welded to the lower end of the sliding frame member 21 so that this member can be moved downwardly at will by the operator pressing against the finger 53.

I claim:

1. A locking gun rack having a barrel supporting frame member and a stock supporting frame member, one of said frame members including a locking mechanism comprising:
    (a) a first vertical member for attachment to a supporting surface;
    (b) at least one gun yoke having first and second ends and being affixed at said first end to said first vertical member;
    (c) a latch member having first and second ends with said first end having a region of reduced cross-section, said second end being pivotally attached to the second end of said gun yoke;
    (d) a vertical slot contained in said first vertical member for permitting the passage of the first end of said latch member therethrough;

(e) a second vertical member attached adjacent to said vertical member and slidable between first and second positions with respect thereto;

(f) a securing slot contained in said second vertical member;

(g) a bolt having a shank portion extending through said securing slot and a threaded portion threaded through said first vertical member;

(h) means for engaging said threaded portion of the bolt and preventing rotation thereof;

(i) a carriage vertical slot contained in said second vertical member and aligned with respect to said first member slot, said second member slot having a reduced section at the lower end thereof;

(j) an enlarged head portion affixed to the first end of said latch member and capable of passing through said aligned slots when the second vertical member is in the first position, the reduced section of the second member slot being located for the engagement behind said enlarged head portion when said second vertical member is in the second position; and (k) locking means for preventing movement of said second vertical member relative to said first vertical member when said aligned slots are in said second position.

2. The locking gun rack according to claim 1 wherein said carriage bolt shank is square and said securing slot includes a straight portion for receiving said square shank and preventing rotation of said carriage bolt and further said securing slot includes an enlarged portion for permitting rotation of said carriage bolt.

3. The locking gun rack according to claim 2 including spring means for urging said second vertical member relative to said first vertical member wherein said slots are in said first position of said aligned slots.

4. The locking gun rack according to claim 3 wherein said locking means comprises a key operated bolt receivable through holes in said first and second vertical members.

5. The locking gun rack according to claim 4 wherein said locking means is attached to said first vertical member.

6. The locking gun rack according to claim 5 wherein said second vertical member includes an extension for facilitating movement of said second member into a locking position.

* * * * *